United States Patent [19]

Alfes et al.

[11] 4,430,483

[45] Feb. 7, 1984

[54] PROCESS FOR THE PRODUCTION OF WATER-RESISTANT, FILM-FORMING CHLORINATED POLYMERS

[75] Inventors: Franz Alfes; Hermann Perrey; Karl-Heinrich Meyer, all of Krefeld; Diez Heine, Leverkusen; Friedrich Kowitz, Dormagen, all of Fed. Rep. of Germany

[73] Assignee: Bayer Akiengesellschaft, Leverkusen, Fed. Rep. of Germany

[21] Appl. No.: 341,232

[22] Filed: Jan. 21, 1982

[30] Foreign Application Priority Data

Jan. 27, 1981 [DE] Fed. Rep. of Germany ....... 3102511

[51] Int. Cl.$^3$ ........................ C08F 8/22; C08C 19/14; C08C 2/02
[52] U.S. Cl. .................................. 525/356; 528/494; 528/499; 528/500
[58] Field of Search ................ 525/356; 528/494, 499, 528/500

[56] References Cited

U.S. PATENT DOCUMENTS 4,122,249 10/1978 Padget .............................. 528/486
4,172,104 10/1979 Padget .............................. 528/494

*Primary Examiner*—C. A. Henderson
*Attorney, Agent, or Firm*—Connoly and Hutz

[57] ABSTRACT

The invention relates to a process for the production of a chlorinated polymer having a chlorine content of from 30 to 70% by weight, which comprises chlorinating a polymer in a chlorinated hydrocarbon solvent, removing the solvent using steam and/or hot water in the presence of at least 1% by weight, based on the chlorinated polymer, of an alkoxylation product of 1 mole of a primary aliphatic alcohol containing at least 8 carbon atoms and at least 1.5 moles of propylene oxide and drying the precipitated chlorinated polymer.

3 Claims, No Drawings

PROCESS FOR THE PRODUCTION OF WATER-RESISTANT, FILM-FORMING CHLORINATED POLYMERS

BACKGROUND OF THE INVENTION

This invention relates to a process for the production of film-forming chlorinated polymers which, as lacquer films, are highly resistant to water.

1. Field of the Invention

Aliphatic polymers, such as natural rubber, polyisoprene, polybutadiene, polyethylene, polypropylene and polyethylene-propylene copolymers, may be chlorinated by introducing gaseous chlorine into a solution of the polymer in a chlorine-resistant organic solvent, for example at from 60° to 120° C. The chlorine-resistant solvent normally used is carbon tetrachloride which, although particularly suitable, necessitates specialised safety measures for ecological reasons. On completion of the chlorination reaction, the polymer may be recovered in solid form from solution in the chlorine-resistant organic solvent by treating the mixture with hot water or steam. Some of the organic solvent used distills off, while the chlorinated polymer precipitates and may be filtered off. The main product obtained then contains from 30 to 60%, by weight, of water in addition to considerable residues of the organic solvent. The organic solvent is not completely removed even by drying the product in vacuo or in a gas stream. For example, from 5 to 10 parts, by weight, of organic solvent remain 100 parts, by weight, of the chlorinated polymer (cf. German Offenlegungsschrift No. 2,359,461 = U.S. Pat. No. 4,144,203).

For use as a coating composition, the chlorinated polymer is dissolved in a conventional lacquer solvent, for example, toluene. The remaining residues of the chlorination solvent, mainly chlorinated hydrocarbons, pass into the solution and evaporate on coating. To avoid this, the residue of chlorination solvent in the chlorinated polymers used for coating purposes has to be reduced.

2. Description of the Prior Art

It is known (cf. German Offenlegungsschrift No. 2,701,288 = U.S. Pat. No. 4,122,249) that, when the solution of the chlorinated polymer in the chlorine-resistant organic solvent is treated with hot water or steam, it is possible to add to the solution a small quantity, by weight, of an aliphatic alcohol containing at least 8 and preferably 12 carbon atoms in order to reduce the residue of chlorination solvent in the chlorinated polymer. However, this process is attended by the disadvantage that the precipitated product tends to stick to the walls of the precipitation vessel. In addition, a further reduction in the residual solvent content appears desirable (cf. also German Offenlengungsschrift No. 2,559,461).

Improved results are obtained (cf. German Offenlegungsschrift No. 2,818,647 = U.S. Pat. No. 4,172,104) when the treatment of the solution of the chlorinated polymer in the chlorine-resistant organic solvent with hot water or steam is carried out in the presence of a small quantity, by weight, of an ethoxylation product of 1 mole of a primary aliphatic mono-hydric alcohol containing at least 8 carbon atoms and from 2 to 20 moles of ethylene oxide.

From 70 to 80% of the ethoxylation product remains in the chlorinated polymer.

A major disadvantage here is that, as lacquered films, the chlorinated polymers precipitated using ethoxylated aliphatic alcohols have a lower resistance to water than corresponding films of additive-free chlorinated polymers.

SUMMARY OF THE INVENTION

An object of the present invention is to provide a process for the production of chlorinated film-forming polymers which, as lacquer films, show a high resistance to water.

According to the present invention, this object is achieved in that, after chlorination of the film-forming polymer in solution in a chlorinated hydrocarbon, the solvent is removed using steam and/or hot water in the presence of a small quantity of a propoxylation product of 1 mole of a primary aliphatic alcohol containing at least 8 carbon atoms and at least 1.5 moles of propylene oxide, optionally in the additional presence of a chlorinated paraffin containing from 8 to 22 carbon atoms and having a chlorine content of from 40 to 70%, by weight.

It must regarded as extremely surprising that the present process should give film-forming chlorinated polymers which, as a lacquer film, have a higher resistance to water than films of the same film-forming chlorinated polymers produced without the addition of an auxiliary. The fact that the propoxy groups are less hydrophilic that ethoxy groups could at best have been expected to result in a slight improvement in resistance to water by comparison with film-forming chlorinated polymers obtained in the presence of ethoxylated alcohols in accordance with German Offenlegungsschrift No. 2,818,647.

Accordingly, the present invention relates to a process for the production of chlorinated polymers containing from 30 to 70%, by weight, of chlorine and forming water-resistant films by chlorinating the polymers in at least one chlorinated hydrocarbon as solvent and removing the solvent using steam and/or hot water in the presence of at least 1%, by weight, based on the chlorinated polymer, of an alkoxylation product of 1 mole of a primary aliphatic alcohol containing at least 8 carbon atoms and at least 1.5 moles of an alkylene oxide and drying the chlorinated polymer precipitated, characterised in that a propoxylation product of the above-mentioned alcohols and propylene oxide is used as the alkoxylation product.

The present invention also relates to the mixtures of chlorinated polymer and the described propoxylation products obtained by the process according to the present invention.

DESCRIPTION OF THE PREFERRED EMBODIMENTS

Polymers suitable for chlorination are, for example, aliphatic polymers, such as natural rubber, polyisoprene, polybutadiene, polyethylene, polypropylene, ethylene/propylene copolymers or mixtures thereof.

In the context of the present invention, chlorinated hydrocarbons are, for example, carbon tetrachloride, trichloroethylene, chloroform, tetrachloroethane, methylene chloride or mixtures thereof.

The propoxylation products used in the process according to the present invention are addition products of 1 mole of a primary aliphatic alcohol containing at least 8 carbon atoms, preferably from 12 to 18 carbons atoms, and at least 1.5 moles, preferably from 2 to 18, more particularly from 2 to 10 moles, of propylene oxide. The propoxylation products are obtained by known processes, for example in accordance with Houben-Weyl, Methoden der Organischen Chemie, Vol. XIV/2, pages 425 et seq.

The propoxylation product may be added to the solution of the chlorinated polymer before or during the treatment with steam or hot water. The propoxylation product is added in a quantity of at least 1%, by weight, preferably from 2 to 10%, by weight, based on the chlorinated solvent-free polymer.

If desired, the propoxylation product may be used in combination with at least one chlorinated paraffin containing from 8 to 22 carbon atoms and having a chlorine content of from 30 to 70%, by weight. The chlorinated paraffin may be added in a quantity of from 1 to 10%, by weight, based on the chlorinated polymer. Accordingly, the total quantity of the mixture of propoxylation product and chlorinated paraffin may amount to from 2 to 20%, by weight, based on the chlorinated polymer.

Production of the chlorinated polymer and separation of the organic, chlorine-resistant solvent used with steam and/or hot water are carried out by known methods, for example in accordance with German Offenlegungsschrift No. 2,359,461.

The chlorinated polymers obtained in accordance with the present invention are mixtures of from 90 to 99%, by weight, of chlorinated polymers and from 1 to 10%, by weight, of propoxylation products of the type defined above. When chlorinated paraffins are also used, the mixture consists of from 80 to 98%, by weight, of chlorinated polymer and from 2 to 20%, by weight, of propoxylation product and chlorinated $C_8$–$C_{22}$ paraffin.

The chlorinated polymers obtained in accordance with the present invention show excellent resistance to water and are used as coating compositions for underwater rust-proof and acid-proof coatings.

The percentages quoted in the following Examples represent percentages by weight, unless otherwise indicated.

EXAMPLE 1

100 parts, by weight, of soluble cis-1,4-polyisoprene are dissolved in 1740 parts, by weight, of carbon tetrachloride. Chlorine gas is introduced into the solution at from 65° to 80° C. until the chlorine content of a sample of the chlorinated polymer amounts to 66%. Chlorine and hydrogen chloride are then removed by purging with nitrogen.

10.4 parts, by weight of a propoxylated lauryl alcohol containing two propoxy groups per mole of OH are then added to this solution which contains 260 g of chlorinated polymer. The mixture is then stirred for 5 minutes at 40° C. until the propoxylated lauryl alcohol has completely dissolved, after which the solution is sprayed with stirring through an atomising nozzle (diameter 0.1 mm; pressure 50 bars) into water heated to 95° C. The addition is complete after 15 minutes. The chlorinated polymer precipitated is stirred for about 1 hour at 95° C. in the precipitation vessel, steam being passed through the suspension.

The chlorinated polymer precipitated is then filtered off and dried for 24 hours at 80° C. in a vacuum drying cabinet. The residual carbon tetrachloride content of the dried chlorinated polymer amounts to 0.2%. The chlorinated polymer contains 3.2% of propoxylated lauryl alcohol.

The data of other polymers produced in the same way as in Example 1 are set out in Table I below:

TABLE I

| Example No. | Chlorinated polymer produced from | % Cl | Propoxylation product used Alcohol | Average number of propoxy units per mole of alcohol | Residual $CCl_4$-content of the polymer | % of propoxylation product in the polymer |
|---|---|---|---|---|---|---|
| 1a | mixture of 70% of cis-1,4-polyisoprene and 30% of polybutadiene | 65.8 | fatty alcohol mixture of 2% of $C_{14}$— 51% of $C_{16}$— 28% of $C_{18}$—, 14% of $C_{20}$ and 5% of $C_{22}$— alcohol | 2.8 | 0.5% | 3.3 |
| 1b | mixture of 70% of cis-1,4-polyisoprene and 30% of polybutadiene | 65.8 | technical $C_{12}$–$C_{18}$ fatty alcohol mixture | 4.2 | 0.5% | 3.4 |
| 1c | mixture of 70% of cis-1,4-polyisoprene and 30% of polybutadiene | 65.8 | myristyl alcohol | 5.0 | 0.5% | 3.2 |
| 1d | mixture of 70% of cis-1,4-polyisoprene and 30% of polybutadiene | 65.8 | cetyl alcohol | 2.0 | 0.5% | 3.2 |
| 1e | mixture of 70% of cis-1,4-polyisoprene and 30% of polybutadiene | 65.8 | stearyl alcohol | 2.0 | 0.5% | 3.5 |
| 1f | mixture of 70% of cis-1,4-polyisoprene and 30% of polybutadiene | 65.8 | oleyl alcohol | 3.0 | 0.5% | 3.5 |

| Example No. | Chlorinated polymer produced from | % Cl | Propoxylation product used Alcohol | Average number of propoxy units per mole of alcohol | Residual CCl-content of the polymer | % of propoxylation product in the polymer |
|---|---|---|---|---|---|---|
| 1g | natural rubber containing 0.9% of | 67.5 | fatty alcohol mixture of 2% of | 9.8 | 0.9% | 3.2 |

TABLE I-continued

| | | | | | | |
|---|---|---|---|---|---|---|
| | N | | | $C_{14}$—, 51% of $C_{16}$—, 28% of $C_{18}$—, 14% of $C_{20}$ and 5% of $C_{22}$— alcohol | | |
| 1h | isotatic polyethylene | 64.0 | fatty alcohol mixture of 2% of $C_{14}$—, 51% of $C_{16}$—, 28% of $C_{18}$—, 14% of $C_{20}$ and 5% of $C_{22}$— alcohol | 3.0 | 0.5% | 3.0 |
| 1i | isotatic polypropylene | 65 | fatty alcohol mixture of 2% of $C_{14}$—, 51% of $C_{16}$—, 28% of $C_{18}$—, 14% of $C_{20}$ and 5% of $C_{22}$— alcohol | 3.0 | 0.5% | 3.0 |

Table II shows the resistance to water of films of the chlorinated polymers of Example 1-1i. For comparison, Table II also shows the resistance to water of films of the chlorinated polymers of Example 1-1i free from propoxylation products. In addition, the procedure of Example 1 was repeated with the difference that the propoxylated lauryl alcohol was replaced by the same quantity of ethoxylated lauryl alcohol (on average 2 ethoxy groups per mole of OH). The resistance to water of films of the resulting chlorinated polymers was determined. The products in question are obtained in accordance with German Offenlegungsschrift No. 2,818,647. Furthermore, Table II shows the resistance to water of films containing chlorinated polymers produced in the same way as described in Example 1 except that, instead of the propoxylation product, the chlorinated polymer contained polypropylene glycol in accordance with German Offenlegungsschrift No. 2,359,461, page 4, line 10 (M=approximately 500).

The lacquer films were produced as follows:

A mixture of 35 parts, by weight, of titanium dioxide pigment, 19.5 parts, by weight, of chlorinated rubber and 45.5 parts, by weight, of xylene is ground on a three-roll stand. Using a spray gun, the lacquer is applied in two coats to degreased steel plates in a total wet layer thickness of from 130 to 140 μm. The thus-coated steel plates are then dried for 14 days at 20° C./50% relative air humidity. The dry layer thickness then amounts to approximately 80 μm. The thus-pre-treated plates are then stored in drinking water at 40° C. The results obtained are set out in the following Table:

TABLE II

| Film of product according to | % Content of Propoxylation product | % Content of Ethoxylation product[1] | Resistance to water |
|---|---|---|---|
| Example 1 (Invention) | 3.2 | — | unchanged after 32 days |
| Example 1 (Comparison) | — | — | after 18 days, bubble formation with rusting underneath |
| Example 1 (Comparison) | — | 3.2 | after 9 days, bubble formation with rusting underneath |
| Example 1 (Comparison) | 3.2 PPG[2] | — | after 10 days, bubble formation with rusting underneath |
| Example 1a (Invention) | 3.3 | — | unchanged after 32 days |
| Example 1a (Comparison) | — | — | after 18 days, bubble formation with rusting underneath |
| Example 1b (Invention) | 3.4 | — | unchanged after 32 days |
| Example 1b (Comparison) | — | — | after 18 days, bubble formation with rusting underneath |
| Example 1c (Invention) | 3.2 | — | unchanged after 32 days |
| Example 1c (Comparison) | — | — | after 18 days, bubble formation with rusting underneath |
| Example 1d (Invention) | 3.2 | — | unchanged after 32 days |
| Example 1d (Comparison) | — | — | after 18 days, bubble formation with rusting underneath |
| Example 1e (Invention) | 3.5 | — | unchanged after 32 days |
| Example 1e (Comparison) | — | — | after 18 days, bubble formation with rusting underneath |
| Example 1f (Invention) | 3.5 | — | unchanged after 32 days |
| Example 1f (Comparison) | — | — | after 18 days, bubble formation with rusting underneath |
| Example 1g (Invention) | 3.2 | — | unchanged after 32 days |
| Example 1g (Comparison) | — | — | after 18 days, bubble formation with rusting underneath |
| Example 1h (Invention) | 3.0 | — | unchanged after 30 days |
| Example 1h (Comparison) | — | — | after 18 days, bubble formation with rusting underneath |
| Example 1i (Invention) | 3.0 | — | unchanged after 50 days |
| Example 1i (Comparison) | — | — | after 38 days, bubble formation with rusting underneath |

[1] ethoxylated lauryl alcohol containing approximately 2 moles of ethylene oxide units per mole of alcohol according to German Offenlegungsschrift No. 2,818,647
[2] polypropylene glycol according to German Offenlegungsschrift No. 2,359,461

EXAMPLE 2

70 parts, by weight, of soluble cis-1,4-polyisoprene and 30 parts, by weight, of polybutadiene are dissolved in 1740 parts, by weight, of carbon tetrachloride. Chlorine gas is introduced into the resulting solution at from 65° to 80° C. until the chlorine content of a sample of the chlorinated polymer amounts to 66%. Chlorine and hydrogen chloride are then removed by purging with nitrogen. The solution is then sprayed, while stirring, through an atomising nozzle (diameter of 0.1 mm; pressure 60 bars) into water heated to 95° C. After the addition, the chlorinated polymer precipitated is stirred in the precipitation vessel for 1 hour in the presence of steam. A mixture of 5.2 parts, by weight, of a propoxylated lauryl alcohol containing on average 3 propoxy groups per molecule of alcohol and 7.8 parts of a chlorinated paraffin containing from 12 to 18 carbon atoms and 42% of chlorine is then added to the aqueous suspension of the chlorinated polymer precipitated, after which steam is introduced with stirring for 1 hour at 95° C. The chlorinated polymer precipitated is then filtered off and dried for 24 hours at 80° C. in a vacuum drying cabinet. The dried, chlorinated polymer has a residual carbon tetrachloride content of 0.1% and contains 3.5% of propoxylated lauryl alcohol.

The lacquer films were produced in accordance with Example 1. The lacquered steel plates did not show any visible signs of change after storage for 35 days in drinking water at 40° C., while comparison plates free from the propoxylated lauryl alcohol and chlorinated paraffin showed bubble formation with rusting underneath after only 18 days.

We claim:

1. A process for the production of a chlorinated polymer having a chlorine content of from 30 to 70%, by weight, which comprises chlorinating a polymer selected from the group consisting of natural rubber, polyisoprene, polybutadiene, polyethylene, polypropylene, ethylene/propolyene copolymers and mixtures thereof in a chlorinated hydrocarbon solvent, removing the solvent using steam, hot water or a mixture thereof in the presence of at least 1 to 10%, by weight, based on the chlorinated polymer, of an alkoxylation product of 1 mole of a primary aliphatic alcohol containing from 12 to 18 carbon atoms and from 2 to 18 moles propylene oxide and drying the precipitated chlorinated polymer.

2. A process as claimed in claim 1 in which the solvent is removed in the presence of from 2 to 20%, by weight, based on the chlorinated polymer, of a mixture of the alkoxylation product and a chlorinated $C_8$-$C_{22}$ paraffin having a chlorine content of from 40 to 70%, by weight.

3. A process as claimed in claim 1 in which the solvent is carbon tetrachloride, trichloroethylene, chloroform, tetrachloroethane, methylene chloride or mixtures thereof.

* * * * *